Feb. 27, 1940. R. J. L. MOINEAU Re. 21,374
GEAR MECHANISM
Original Filed April 18. 1935 3 Sheets-Sheet 1
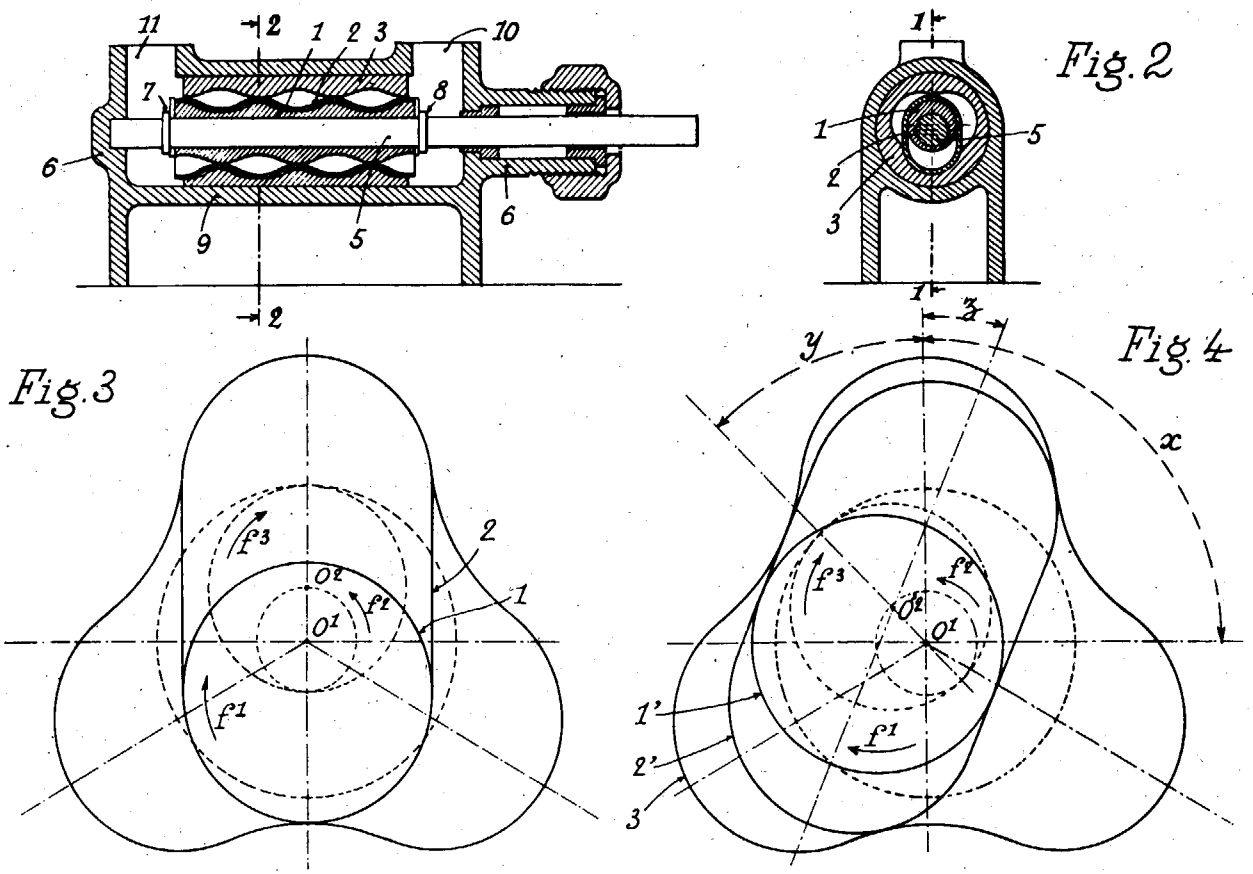
René Joseph Louis Moineau
INVENTOR
By Otto Munk
his ATT'Y.

Feb. 27, 1940. R. J. L. MOINEAU Re. 21,374

GEAR MECHANISM

Original Filed April 18, 1935 3 Sheets-Sheet 2

René Joseph Louis Moineau
INVENTOR

By Otto Munk
his ATTY.

Feb. 27, 1940. R. J. L. MOINEAU Re. 21,374

GEAR MECHANISM

Original Filed April 18, 1935 3 Sheets-Sheet 3

René Joseph Louis Moineau
INVENTOR

By Otto Munch
his ATTY.

Reissued Feb. 27, 1940 Re. 21,374

UNITED STATES PATENT OFFICE 21,374

GEAR MECHANISM

René Joseph Louis Moineau, Paris, France, assignor to Société d'Exploitation des Brevets Moineau, Luxemburg, Grand Duchy of Luxemburg, a corporation of Luxemburg Original No. 2,085,115, dated June 29, 1937, Serial No. 16,959, April 18, 1935. Application for reissue September 23, 1938, Serial No. 231,424. In Morocco May 2, 1934

12 Claims. (Cl. 74—466)

The present invention has for its object a gear mechanism adapted for use as a pump, compressor, motor, or simple transmission device, and even, simultaneously, for several such uses. The said mechanism is chiefly characterized by the fact that it comprises at least three helical gear elements mounted one within the other. In each group of two meshing elements the element the threads of which are enveloped has one thread, or tooth, less than the enveloping element and each thread or tooth of the enveloped element is also, in each transverse section, in constant contact with the enveloping element, the pitches, which may be constant or not, of the helices of these sets of threads being in each cross-section, in the ratios represented by the ratios of the numbers of teeth in the said elements.

Preferably, the said elements directly envelop one another, and each element has one thread or tooth more than the element which it directly envelops; each thread or tooth of one element is also, in each transverse section in constant contact with the adjacent element, the pitches, which may be constant or not, of the helices of all of said elements being, in each cross-section, in the ratios represented by the ratios of the numbers of teeth of each of the said elements.

By the combination of at least three such elements, there may be obtained in the first place a greater output for a given size, a simpler construction, a better balancing, as well as other features, which will be set forth in the following description.

In the accompanying drawings, which are given solely by way of example:

Fig. 1 is a longitudinal section, on the line 1—1 of Fig. 2, of a simple device according to the invention;

Fig. 2 is a cross-section on the line 2—2 of Fig. 1;

Figs. 3 and 4 are geometric diagrams on a larger scale, showing different positions occupied by the three helical elements when the central element is rotated;

Figure 5:
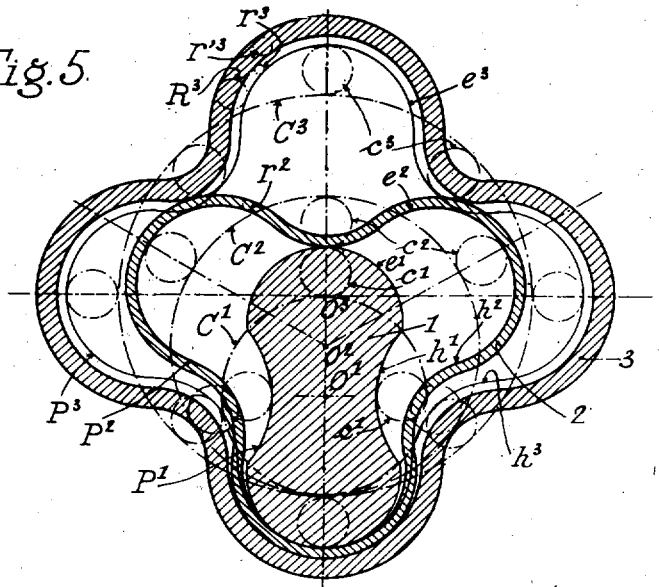
Fig. 5 represents the gear outlines.

According to the embodiment represented in Figs. 1 and 2, the mechanism comprises three helical gear elements 1, 2, 3, located one within the other. The external element 3 comprises three teeth or threads, the intermediate element 2 comprises two such threads, and the central element 1 has only one tooth or thread. The pitches of the threads are constant, and are in the respective ratios of three-to-two and two-to-one. The external helical element 3 is provided with threads the length of which is at least equal to the length of the pitch, this being necessary for obtaining non-leaking conditions for the elements 2—3. The internal helical element 1 is mounted on a shaft 5 which is supported at its ends, in bearings 6; one of said bearings may be eliminated. The intermediate element 2 is quite free as to rotation and its thrust is limited at each end, for instance by discs 7—8 mounted on shaft 5. The external element 3 is stationary. It is contained in the casing 9 or is formed in one with the casing, which is provided at 10 and 11 with connections adapted for the admission or the discharge of the fluid which either provides power or is transported by the mechanism.

The helical elements 1—2—3 may consist of any suitable substance.

One or more of these elements may be made of elastic material (india rubber, for instance) in order to ensure better non-leaking conditions, and a better lubrication in the case where for instance water is operated upon.

The intermediary element, for example, which may be very thin, may be constructed for instance by the stamping process, or by an electrolytic deposit upon a mould of suitable form.

By an examination of Figs. 3 and 4, in which the helical elements are represented diagrammatically by their cross-sections taken at any point of their length, such sections being reduced to the corresponding basic curves, it will be at once observed that when rotating the section of the central element 1 about the point O′ (representing the axis of this element), for instance in the direction of the arrow $f'$ (Fig. 3), the center $O^2$ of the cross-section of the intermediate element 2 will rotate about the center O′ in the contrary direction (arrow $f^2$), whereas this cross-section of the element 2 will rotate about its own center $O^2$ in the same direction (arrow $f^3$). By comparing the Figures 3 and 4, it will be observed that when the element 1 proceeds, for instance, to the position 1' after a rotation $x$ through 90° in the direction of the arrow $f'$, the element 2 will have come to 2', its center having attained $O'^2$ by a rotation $y$ about $O^1$ in the direction of the arrow $f^2$, which section has rotated through $z$ in the direction $f^2$ about $O'^2$.

In short, it is observed that the rotation of element 1 will cause a rotation of the element 2, which at the same time is given an angular displacement with reference to the stationary external element 3.

The conditions for one cross-section remain the same for all sections.

In short, each group of two elements 1—2 and 2—3 will constitute a set of gearing which forms closed spaces, and these spaces, without the least longitudinal displacement of the elements, will move axially during the rotation, thus transporting their contents from one end of the gearing to the other, and hence the latter may be employed as a pump, a compressor, a motor, or simply as a power transmission device. The outputs of fluid circulating in the two groups are added together.

It will be observed that the output is greater for practically the same size, than it would be if there were only a single gear set with two elements; that there is no need of an elastic connection, by Cardan devices or the like; that the unequal motion due to the eccentric rotation of the axis of the element 2 is reduced, as this member is hollow and may have a light weight, and as the rotation of its center of gravity takes place at reduced speed (half the speed of the element 1 in the example indicated).

Figure 6:
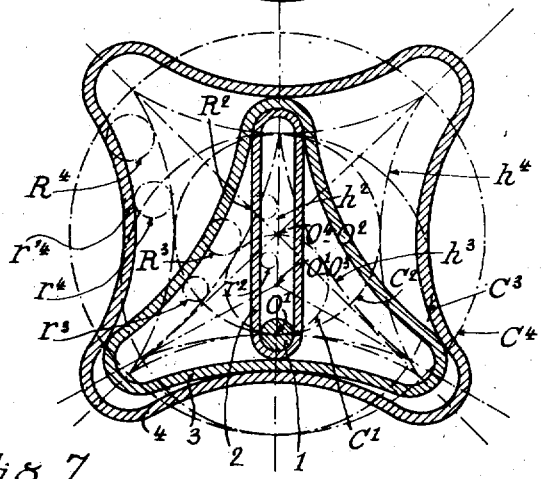
Fig. 6 represents another set of outlines which are combined in another manner.

Figs. 5 and 6 represent examples of outlines which may be employed for the construction of gearing; Fig. 5 represents a cross-section of a set of gearing in which the elements 1—2—3 have two, three and four teeth, or more exactly, two, three or four helical threads. The pitch circles $C^1$, $C^2$, $C^3$ of these elements 1—2—3 have diameters in the ratio of two, three and four, and the basic outlines $P^1$, $P^2$, $P^3$ of these profiles are epicycloids $e^1$, $e^2$, $e^3$ which are joined to hypocycloids $h^1$, $h^2$, $h^3$, whose generating circles $c^1$, $c^2$, $c^3$, rolling upon the circles $C^1$, $C^2$, $C^3$, have diameters equal to the distances between the centers $O^1$, $O^2$, $O^3$ of these circles.

The element 1 may be solid.

In order to obtain a certain thickness for the element 2, there is taken as the external outline of this element 2, the envelope of a small circle $r^2$ rolling upon the basic profile $P^2$ of this element 2.

As to the external element 3, its thickness is comprised between the envelopes of two circles $R^3$ and $r^3$ rolling upon the basic profile $P^3$, or, what is the same thing, as can be readily shown, between the envelope of the circle $r^3$ rolling upon the basic profile $P^3$ and the envelope of a circle $r'^3$ which rolls upon the said envelope of the circle $r^3$.

Fig. 6 represents a cross-section of a set of gearing in which the helical elements 1—2—3—4, i. e., the successive elements numbered 1, 2, 3, 4 counting from the innermost to the outermost element, have respectively, one, two, three and fourth teeth (or more exactly, one, two, three and four helical threads). The pitch circles $C^1$, $C^2$, $C^3$, $C^4$ of the elements 1, 2, 3, 4 have diameters in the ratio of one, two, three and four. One feature of the device represented is that the pitch circles $C^1$, $C^3$ of the elements 1 and 3; i. e., the elements numbered by uneven numbers of teeth, have their centers $O^1$ and $O^3$ in coincidence, and the same is true for the centers $O^2$ and $O^4$ of the pitch circles $C^2$, $C^4$ of the elements 2 and 4; i. e., the elements numbered by even numbers.

The basic curves consist of hypocycloids: $h'$ (reduced to the point $O^x$), $h^2$ (a straight line), $h^3$, $h^4$, whose generating circles, not shown, rolling in the pitch circles $C^1$, $C^2$, $C^3$, $C^4$, have all a radius equal to the distance $O^1 O^x$.

The element 1 is solid, and is obtained by causing a small circle to roll about the basic point ($O^x$ in the figure).

The thickness of the elements 2, 3, 4 is obtained, as in the preceding example, by causing to roll upon the hypocycloids $h^2$, $h^3$, $h^4$.

For the element 2, circles or rollers $r^2$ and $R^2$, upon the hypocycloid $h^2$, the radius of the circle $r^2$ being equal to that of the small circle which served to determine the element 1.

For the element 3, the circles or rollers $r^3$ and $R^3$.

For the element 4, the circles or rollers $r^4$ and $R^4$ (or $r^4$ and $r'^4$).

Figure 7:
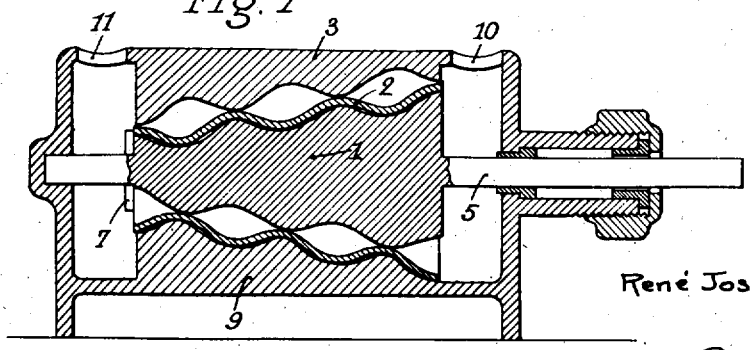
Fig. 7 represents, in longitudinal section, a modified construction of the mechanism shown in Fig. 1.

Fig. 7 represents a mechanism analogous to the one shown in Fig. 1, but with tapered gearing.

It is a known fact that the characteristeric elements of the gearing in conformity with the invention consist of the pitch ($p$), the eccentricity ($e$), the pitch circles, and the diameters ($d$) of the small circles such as $r^1$, $r^2$, $r^3$ (Fig. 5), whose envelopes determine the outlines $P^1$, $P^2$, $P^3$, etc.

In the example shown in Fig. 7, the cones are obtained by the longitudinal variation (that is to say, from one cross-section to the next cross-section), of a diameter $d$ of each element 1—2—3. It is an observed fact that in such a device the axes of the gear members are parallel.

It is further possible to provide for a longitudinal variation of the eccentricity $e$ of the pitch circles, and in this case, it is observed that the axes would no longer be parallel. These two arrangements (with $d$ or $e$ variable lengthwise of the mechanism), will permit, as is known, a variation of the cross-sections of the closed spaces formed between the elements of the gearing, and this will permit, according to the direction of movement in the case of a compressible fluid contained in such spaces, either the compression or the expansion of this fluid.

It is a known fact that it is further possible to vary the aforesaid sections by a variation of the pitch ($p$), or of $p$ and $e$, $p$ and $d$, $e$ and $d$, at the same time, or otherwise, of $p$, $e$ and $d$. The longitudinal variations may be effected according to any suitable formula.

Figure 8:
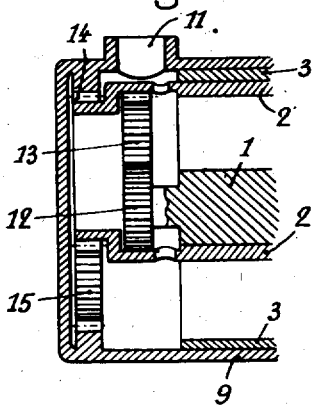
Fig. 8 represents a method for guiding the elements of the mechanism shown in Fig. 1.

Fig. 8 shows that the groups of three elements 1—2—3 (or more) may be guided by gear wheels having any number of small teeth of a usual outline which have the same pitch circles. The example of the guiding herein represented is applicable to the mechanisms shown in Figs. 1 and 5. The element 1 carries at the end a pinion 12 which rolls in an internal tooth ring 13 secured to the element 2 which latter carries a pinion 14 rolling in an internal tooth ring 15, secured to the fixed element 3.

Figure 9:
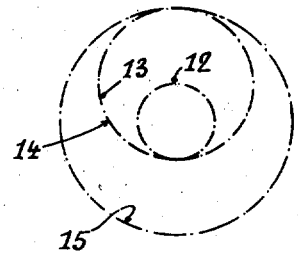
Fig. 9 shows the pitch circles of the spur gear wheels used for guiding.

For the sake of greater clearness in Figs. 8 and 9, and also in the following figures, the elements 1—2—3 are represented by cylinders whose diameters are equal to those of the pitch circles of each of the same.

Figure 10:
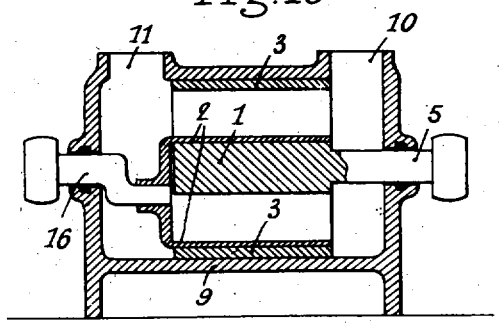
Figs. 10 and 11 represent other modified embodiments of the mechanism according to the invention.

Fig. 10 represents a mechanism having three elements 1—2—3 which have respectively one, two and three teeth. The element 3 is stationary, the element 2 is loose on a crank-shaft 16, and the element 1 is actuated by its shaft 5.

The elements 1 and 2 may be given any suitable speed in the same direction or not; the outputs of the groups 1, 2 and 2, 3 may be added or subtracted. It will be readily understood that such a mechanism can be used, at will, as a pump, a compressor, a motor, or a simple power transmission device, and also, simultaneously for several of these uses.

Figure 11:
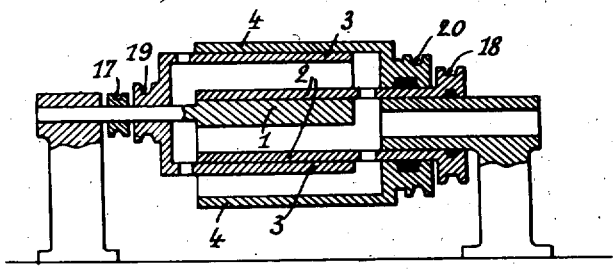

Fig. 11 represents a mechanism with four elements 1—2—3—4, having the disposition shown diagrammatically in Fig. 6. It consists of elements 1 and 3 having one and three concentric teeth, and of elements 2 and 4 having two and four concentric teeth. A driving pulley 17—18—19—20 is mounted on each element. 21 is a stationary bearing for the rotary element 1 and 22 is a similar bearing for element 2.

The outputs of this mechanism when used as a pump, a compressor or a motor, are added together, and the speeds of the pulleys have the ratios represented by the Figures 4, 3, 2, 1, and may be used in this manner as speed transmission devices. It is evident that the mechanisms of the types represented in Figs. 10 and 11, but of a more complicated nature, might comprise any number of helical elements having $n$, $n+1$, $n+2$ . . . teeth.

All these groups of at least three helical elements, one within the other, have all the properties of analogous mechanisms having two gear-wheels, such as pumps, compressors, motors, or simple transmission devices, and can even be employed for several of these uses at the same time.

A certain number of these mechanisms may also be grouped end-to-end, or in the parallel or the radial position, etc.

Obviously, the invention is not limited to the embodiments represented and described, which have been chosen only by way of example.

Having now described my invention, what I claim as new and desire to secure by Letters Patent is:

1. A gear mechanism adapted to be employed as a pump, compressor, motor, transmission member and the like, or even simultaneously for a number of such uses, comprising at least three helical gear elements, disposed the one within the others, each element having one helical thread more than the element immediately inside same, the threads of the enveloped elements being always in contact in each cross-section with the threads of the corresponding enveloping element and the ratio of the different pitches of these threads being equal to the ratio of the number of threads on said elements.

2. A gear mechanism according to claim 1, in which the pitch circles of the elements of uneven number have a common center and the pitch circles of the elements of even number have also a common center different from the first center.

3. Gear element according to claim 1 in which the intermediate element is made of thin sheet metal.

4. In apparatus of the class described, the combination of an inner rotor element which is externally threaded and mounted for rotation about a fixed axis, an intermediate rotatable element having internal threads which cooperate with the threads on said inner element and which in number are one more than the number of threads on said inner element, and an outer stationary element in which said intermedaite element rotates about an axis offset from the axis of the threads of the intermediate member.

5. In apparatus of the class described, the combination of an externally threaded inner rotor element, an internally threaded intermediate rotatable element the threads of which cooperate with the threaded exterior of said inner element and in number exceed the number of threads on said inner element by one, and an outer stationary element in which said intermediate element rotates, one of said elements being rotatable about an axis offset from the axis of the threads thereof.

6. In apparatus of the class described, the combination of an externally threaded inner rotor element, an internally threaded intermediate rotatable element the threads of which cooperate with the threaded exterior of said inner element and in number exceed the number of threads on said inner element by one, an outer stationary element in which said intermediate element rotates about an axis offset from the axis of the threads of the intermediate member, and a shaft connected with said inner element and extending to the exterior of said outer element, and means engaging the opposite ends of said intermediate element to prevent axial displacement thereof.

7. In apparatus of the class described, the combination of a casing, an inner rotor element which is externally threaded and mounted for rotation in bearings in said casing, an intermediate rotatable element having internal threads which cooperate with the threads on said inner element and which in number are one more than the number of threads on said inner element, and a member fixed in said casing and in which said intermediate element rotates about an axis offset from the axis of the threads of the intermediate member.

8. In apparatus of the class described, the combination of a casing, an inner rotor element which is externally threaded and mounted for rotation in bearings in said casing, an intermediate rotatable element having internal threads which cooperate with the threads on said inner element and which in number are one more than the number of threads on said inner element, said intermediate element also having external threads, and an element fixed in said casing and having internal threads which cooperate with the external threads on said intermediate element and which in number are one more than the number of external threads on said intermediate element.

9. In apparatus of the class described, the combination of a casing, an inner rotor element which is externally threaded and mounted for rotation in bearings in said casing, an intermediate rotatable element having internal threads which cooperate with the threads on said inner element and which in number are one more than the number of threads on said inner element, said intermediate element also having external threads the number of which is the same as the number of said internal threads, and an element fixed in said casing and having internal threads which cooperate with the external threads on said intermediate element and which in number are one more than the number of external threads on said intermediate element.

10. In apparatus of the class described, the combination of a casing, an inner rotor element which is externally threaded and mounted for rotation in bearings in said casing, an intermediate rotatable element having internal threads which cooperate with the threads on said inner element and which in number are one more than the number of threads on said inner element, said intermediate element also having external threads, an element fixed in said casing and having internal threads which cooperate with the external threads on said intermediate element and which in number are one more than the number of external threads on said intermediate element, and means engaging the ends of said intermediate element to prevent axial displacement thereof.

11. In apparatus of the class described, the combination of a casing, an inner rotor element which is externally threaded and mounted for rotation in said casing, an intermediate rotatable element having internal threads which cooperate with the threads on said inner element and which in number are one more than the number of threads on said inner element, an outer element fixed in said casing and in which said intermediate element rotates, and intermeshing gears on said inner and said intermediate elements.

12. In apparatus of the class described, the combination of a casing, an inner rotor element which is externally threaded and mounted for rotation in bearings in said casing, an intermediate rotatable element having internal threads which cooperate with the threads on said inner element and which in number are one more than the number of threads on said inner element, said intermediate element also having external threads, a fixed element in said casing having internal threads which cooperate with the external threads on said intermediate element and which in number are one more than the number of external threads on said intermediate element, a pair of intermeshing gears on said inner and said intermediate elements, and a pair of intermeshing gears one of which is on said intermediate and the other of which is in fixed relation to said fixed element.

RENÉ JOSEPH LOUIS MOINEAU.